(12) United States Patent
Klingbeil

(10) Patent No.: US 10,767,413 B2
(45) Date of Patent: Sep. 8, 2020

(54) MOTOR DRIVE DEVICE OF A VEHICLE SLIDING DOOR

(71) Applicant: Ford Global Technologies, LLC, Dearborn, MI (US)

(72) Inventor: Jochen Klingbeil, Dusseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/188,960

(22) Filed: Nov. 13, 2018

(65) Prior Publication Data

US 2019/0145148 A1 May 16, 2019

(30) Foreign Application Priority Data

Nov. 15, 2017 (DE) .......................... 10 2017 220 326

(51) Int. Cl.
| | |
|---|---|
| *E05F 15/662* | (2015.01) |
| *B60J 5/06* | (2006.01) |
| *E05F 15/657* | (2015.01) |
| *E05F 15/659* | (2015.01) |

(52) U.S. Cl.
CPC .............. *E05F 15/662* (2015.01); *B60J 5/06* (2013.01); *E05F 15/657* (2015.01); *E05F 15/659* (2015.01); *E05Y 2201/216* (2013.01); *E05Y 2201/232* (2013.01); *E05Y 2201/246* (2013.01); *E05Y 2201/434* (2013.01); *E05Y 2900/531* (2013.01)

(58) Field of Classification Search
CPC .................................. E05F 15/662; B60J 5/06

USPC ......................................................... 318/560
See application file for complete search history.

(56) References Cited

U.S. PATENT DOCUMENTS

| | | | |
|---|---|---|---|
| 5,076,016 A * | 12/1991 | Adams | B60J 5/062 49/280 |
| 5,644,869 A | 7/1997 | Buchanan, Jr. | |
| 5,708,338 A * | 1/1998 | Cook | H02H 7/0851 318/286 |
| 5,755,468 A | 5/1998 | Buchanan, Jr. | |
| 5,979,114 A | 11/1999 | Clark et al. | |
| 6,037,727 A | 3/2000 | Kawanobe et al. | |
| 6,100,619 A * | 8/2000 | Buscher | F16H 1/32 310/99 |
| 6,225,904 B1 | 5/2001 | Jaffe et al. | |
| 7,937,893 B2 | 5/2011 | Pribisic | |

(Continued)

*Primary Examiner* — Bentsu Ro
(74) *Attorney, Agent, or Firm* — David Coppiellie; Price Heneveld LLP

(57) ABSTRACT

A motor drive device for moving a vehicle sliding door is provided. The device includes an electric motor, a force transmission mechanism operationally connectable to the vehicle sliding door and the electric motor to transmit a drive force provided by the motor to the sliding door, sensors at least for determining an instantaneous position of the vehicle sliding door, an electronic control unit for activating at least the motor, and a shift clutch coupled to the force transmission mechanism and couplable to the motor for load-independent coupling of the motor to the force transmission mechanism. The control unit, in the event of application of a sufficient force to the sliding door during a power-driven movement, either elevates a speed of the vehicle sliding door by elevating the transmitted drive force or decouples the force transmission mechanism and the motor with the shift clutch.

18 Claims, 4 Drawing Sheets

(56) References Cited

U.S. PATENT DOCUMENTS

2004/0042144 A1* 3/2004 Yokomori ............... E05B 81/20
  361/115
2005/0150167 A1* 7/2005 Yokomori ............. E05F 15/646
  49/360
2006/0175845 A1  8/2006 Arabia, Jr. et al.

* cited by examiner

MOTOR DRIVE DEVICE OF A VEHICLE SLIDING DOOR

FIELD OF THE INVENTION

The present invention generally relates to a motor drive device for moving a movable vehicle sliding door, and more particularly relates to a device and method for operating such a motor drive device during movement of a movable vehicle sliding door between an open position and a closed position.

BACKGROUND OF THE INVENTION

Equipping vehicles, for example, minivans, or other passenger automobiles, with sliding doors, which are arranged on sides of the vehicle and which enable a vehicle interior of the vehicle to be made accessible even under restricted lateral space conditions, is commonly known in the field of automotive engineering. Sliding doors can be manually operable. Sliding doors are also known to be movable by use of a power drive, such as an electric drive, between an open door state and a closed door state.

It is particularly significant in automotive engineering to keep the weight and the costs of an additional power drive as low as possible. For this purpose, an opening and closing control device of a vehicle sliding door for opening a vehicle sliding door installed on a side of a vehicle body is generally described in U.S. Pat. No. 6,037,727. The opening takes place by use of a power drive such as a motor. The purpose of the device is to reduce a load which is exerted on the sliding door, which moves from its completely open position along its closing direction, wherein the device is reduced in size and has a lower weight and lower production costs. Moreover, an actuating force is reduced when the door is manually closed. The control device has a power drive such as a motor, a sliding door, which is opened and closed by a sliding door opening mechanism and sliding door closing mechanism, a coupling means, which intermittently transmits a drive force of the power drive to the sliding door opening mechanism and sliding door closing mechanism, an inclination determination means, which detects a vehicle position, and a sliding door control device, which controls the power drive and the coupling means in order to set a drive force which is to be transmitted to the sliding door opening mechanism and sliding door closing mechanism. If a control for complete opening is carried out and it is established that the vehicle parks on level ground or upward inclination, the sliding door is stopped shortly before the completely open door position.

An opening/closing speed of power-driven vehicle sliding doors of typically 0.2 m/s is generally perceived by many users of the vehicle to be slow in comparison to a typical opening/closing speed during manual operation of 1±0.5 m/s. Users can therefore wish during a power-driven opening/closing movement of the vehicle sliding door to open/close the vehicle sliding door faster while dispensing with the power drive. It is to be noted that in the case of a transition from the power-driven operating mode to the manual operation, a position relationship between the vehicle sliding door and the power drive is to be maintained as much as possible, so that a control system can make use thereof as much as possible upon a return to the power-driven operating mode.

As a solution, U.S. Pat. No. 7,937,893 proposes a sliding door assembly which is actuable to move a vehicle door between an open door position and a closed door position. The assembly comprises a motor which is actuable in a reversible manner to move the door to one of the open and the closed positions. A handle is attached to the door and a handle sensor is provided to detect grasping of the handle. If the handle is grasped, a control unit activates the motor in order to move the door if the handle sensor is triggered and released without door movement. The movement of the door, with the triggered or released handle sensor, by at least a predetermined distance has the effect that the controller deactivates the motor, which enables a manual movement of the door.

Furthermore, U.S. Pat. No. 5,644,869 describes a motor drive, which moves a movable closure between an open position and a closed position in relation to a portal, which defines a passage through a barrier wall. The motor drive can comprise an elongated drive element, which is connected to the movable closure, and a ball screw drive assembly for selectively moving the drive element in the longitudinal direction, in order to position the movable closure between the open position and the closed position in relation to the passage through the barrier wall. The barrier wall can define at least one section of a stationary structure or a vehicle, wherein the passage enables an access to an interior of the structure or the vehicle. The movable closure can comprise a sliding door, a hatch, a window, a rooftop, or the like. The elongated drive element can be an assembled drive element, which has at least one gear wheel or a tooth-type element, which extends in a spiral shape in uniformly spaced-apart turns around a core of the drive element, in order to form a rigid or spring-loaded screw-type section, which can be actuated by operational connection to the ball screw drive assembly. A flexible section, such as a push/pull cable, can be attached to one end of the screw-shaped element, in order to enable the motor drive to move a movable closure along a curved or other nonlinear path. The motor drive enables a desired reversibility, manual actuation, and override operation both for linear and also for curved actuation.

Since moving manually operable sliding doors into a completely closed position requires the application of relatively high force, in particular since the sliding door typically has to be moved against a spring force generated by seals close to the completely closed position, motor-drivable closing element devices have been proposed in the prior art. For example, U.S. Pat. No. 5,979,114 proposes a motor drive system for moving automatically closing sliding doors in such a manner that a control and a motor drive displace the door along the entire fixed path during the opening and closing movement, to then move a clevis pin or a closing element on the door via a secondary locking position into a primary locking position and to ensure complete door securing and door sealing. The motor drive system physically pulls the door and the closing element or the clevis pin connected thereto into the clevis pin or the closing element corresponding thereto, respectively, which is connected to a frame defining an opening, via the secondary position and into the primary locking position, and then starts the closing element movement, which is actuated by motor force, to move the door into weather-stripping seals, which enclose the opening. A central rear suspension roller track is modified such that it accommodates a push/pull drive element, and the displacement means are coupled to the track in order to pull the door into the open or closed door position, respectively. The advantage of the motor drive system is to pull the roller assembly and the door-clevis pin assembly in the motor-operated closing element over the entire path up to the primary locking position, beyond the secondary position. Earlier known motor-operated drive systems required a high vibration moment in order to ensure correct closing of the sliding door assemblies for minivan vehicles. The motor-operated closing element of the motor drive system activates a motor-operated closing element to pull the door into the seals.

Additionally, a driven closing element assembly is described in U.S. Patent Application Publication No. 2006/0175845, which causes a final positioning of a vehicle closure element. Such as a vehicle sliding door or a door hinged using hinges. The closing element assembly comprises a fixed frame and a closing element, which is mounted on a closing plate, in order to be selectively engaged with a bolt, which is attached to the vehicle closure element, in order to displace the vehicle closure element from an instantaneous position to a secured position. A guide means connects the frame and the closing plate in order to cause a simultaneous translational and rotational displacement of the closing plate between end boundaries of a path, in order to generate a linear displacement of the closing element. A positioning element selectively displaces the stop plate between the end boundaries in reaction to a control signal. Finally, a locking unit fixes the closing plate in the secured position in the absence of the control signal.

Furthermore, U.S. Pat. No. 5,755,468 describes a driven closing element device for a movable closure assembly, which comprises a fixed frame which defines a portal through a barrier wall. A movable closure element such as a sliding door, rooftop, hatchback, etc., is attached to the frame for movement along a fixed path between a first end boundary of the movement, in which the closure element is located in a closed position which blocks the portal, and a second end boundary of the movement, in which the closure element is located in an open position. The closing element device can comprise a closing element, which is attached to one of a frame and a closure element. A locking mechanism is attached to the other of the frame and closure element such that the locking mechanism can be engaged with the closing element for the releasable locking of the closure element in the closed position. A holding means is provided, in order to hold the closing element with respect to the locking mechanism for a movement between a first position and a second position. A pre-tensioning element presses the holding means in the direction of the first position. A drive mechanism moves the holding means out of the first position against the pre-tension of the pre-tensioning element in the direction of the second position. The drive mechanism can also selectively release the holding means when it is located in the second position, and therefore the closing element pivots back into the main locking position in reaction to the pressure of the pre-tensioning element, in order to move the closing element dynamically out of the secondary locking position into the main locking position of the locking mechanism.

Conventional power-driven vehicle sliding doors provide a manual operation only upon request by activation of a switch or handle or a similar human-machine interface. This generally means that a change from a power-driven operation to a manual operation is not possible during the power-driven operation.

An opening/closing speed of power-driven vehicle sliding doors is often perceived as excessively slow by users of the vehicle in comparison to a typical opening/closing speed in the case of manual operation. A use of higher electrical powers of the motor drive means, on the one hand, an elevated power consumption; on the other hand, an elevated opening/closing speed of a power-driven vehicle sliding door contradicts the efforts toward a limitation of a potentially acting clamping force and a desired impression of safety. An application of high braking forces, which exceed the forces acting in a normal operation of the vehicle sliding door by many times, requires a corresponding design and is contrary to the demands for compactness in design and the ubiquitous cost pressure.

The field of motor drive devices for moving a movable vehicle sliding door at least between an open position and a closed position still offers room for improvements. In particular, it would be desirable to provide a motor drive device for moving a movable vehicle sliding door at least between an open position and a closed position, which permits at least a change from a power-driven operation to a manual operation during the power-driven operation and enables a speed of the vehicle sliding door elevated in relation to the power drive at least by way of manual operation.

SUMMARY OF THE INVENTION

According to one aspect of the present invention, a motor drive device for moving a movable vehicle sliding door is provided. The motor drive device includes an activatable electric motor, a force transmission mechanism operationally connectable to the vehicle sliding door and the electric motor to transmit a drive force provided by the electric motor to the vehicle sliding door, and one or more sensors determining an instantaneous position of the vehicle sliding door. The motor drive device also includes an electronic control unit for activating at least the electric motor, and a shift clutch coupled to the force transmission mechanism and couplable to the electric motor provided for load-independent coupling of the electric motor to the force transmission mechanism, wherein depending on a preselection by an operator, in the event of application of a force above a predetermined force threshold value to the vehicle sliding door by the operator during a power-driven movement, either elevates a speed of the vehicle sliding door to a predetermined speed value by elevating the transmitted drive force or decouples the force transmission mechanism and the electric motor by use of the shift clutch.

According to another aspect of the present invention, a device for moving a vehicle sliding door is provided. The device includes a motor, a force transmission mechanism to transmit a drive force of the motor to the door, sensors determining position of the door, and a shift clutch for coupling the motor to the force transmission mechanism, wherein application of sufficient force to the door by an operator during motor driven movement either elevates a speed of the door or decouples the force transmission mechanism.

According to yet another aspect of the present invention, a method for operating a motor drive device, during a movement of a movable vehicle sliding door between an open position and a closed position is provided. The method includes the steps of ascertaining a preselection made by an operator, ascertaining a force required for moving the vehicle sliding door to achieve a predetermined normal speed while using stored sensor output signals, and comparing a difference of the ascertained required force and the force instantaneously output by the electric motor to the predetermined force threshold value. The method also includes the steps of in the case of an ascertained first option of the preselection made by the operator and a difference between the ascertained required force and the force instantaneously output by the electric motor, which lies above the predetermined force threshold value, elevating the speed of the vehicle sliding door to the predetermined, elevated speed value by elevating the transmitted drive force, and in the case of the ascertained first option of the preselection and in the case of a difference between the ascertained force required for the elevated speed and the force instantaneously output by the electric motor close to zero, activating the electric motor to decelerate the vehicle sliding door to the predetermined normal speed. The method also includes the step of in the case of an ascertained second option of the preselection made by the operator and in the case of a difference between the ascertained required force and the force instantaneously output by the electric motor, which lies above the predetermined force threshold value, activating the shift clutch to decouple the force transmission mechanism and the electric motor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

It is to be noted that the features and measures listed individually in the following description can be combined with one another in an arbitrary, technically reasonable manner and disclose further embodiments of the invention. The description additionally characterizes and specifies the invention in particular in conjunction with the figures. In the different figures, identical parts are provided with the same reference signs, because of which they are generally also only described once.

Figure 1:
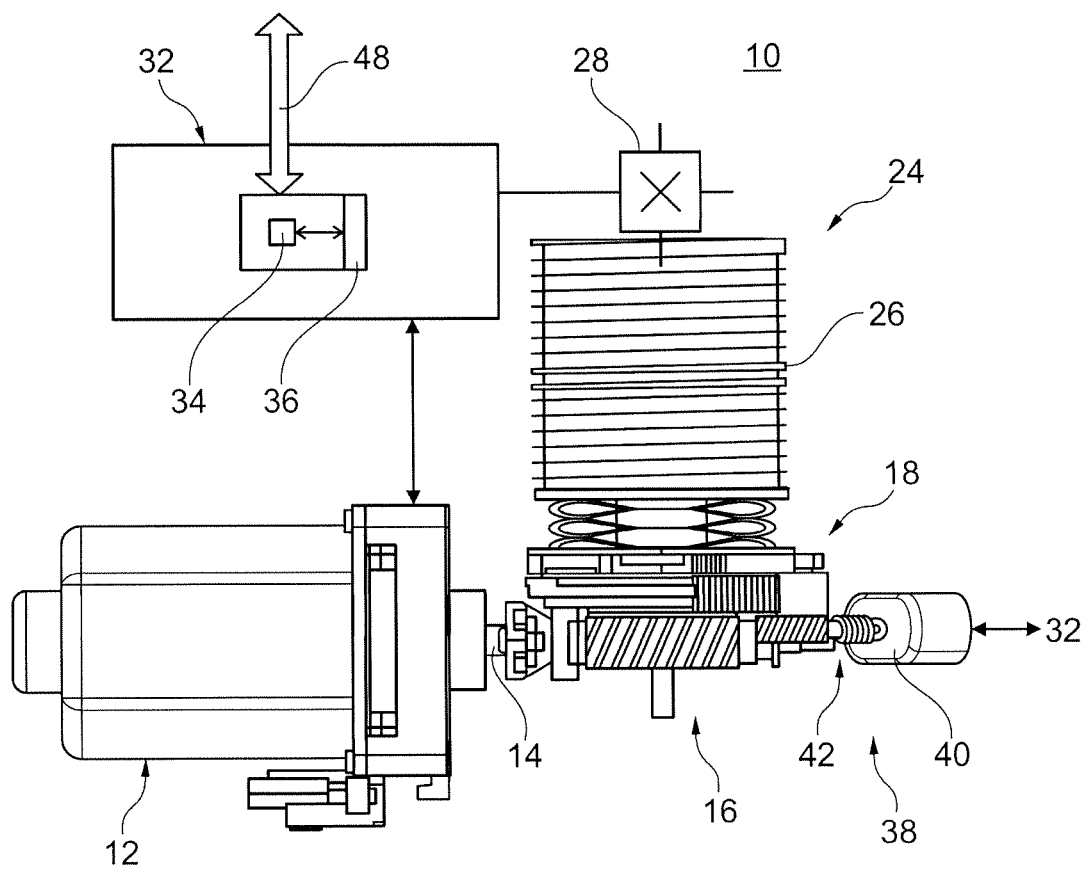
FIG. 1 is a schematic illustration of a motor drive device according to one embodiment for moving a movable vehicle sliding door.

FIG. 1 shows a schematic illustration of a motor drive device 10 according to one embodiment for moving a movable vehicle sliding door having a mass that may be approximately 60 kg, according to one example, which is arranged on one side of a vehicle shown as a minivan. The vehicle sliding door is movable between an open position, in which the vehicle sliding door provides an access to a vehicle interior having a maximum width, and a closed position, in which an access to the vehicle interior is blocked and the vehicle sliding door is secured by a closing device.

The motor drive device 10 comprises an activatable electric motor 12 and an electronic control unit 32 for activating the electric motor 12. The electric motor 12 has a drive shaft 14, which is fixedly connected to the worm of a worm gear 16 as is generally known per se.

The motor drive device 10 furthermore includes a force transmission mechanism 24 for transmitting a drive force provided by the electric motor 12 to the vehicle sliding door. The force transmission mechanism 24 has cylindrical cable drums 26 equipped with channels and a wire cable, which is guided in the channels and is operationally connected to the vehicle sliding door.

A shift clutch 18 for the smooth, load-independent coupling of the electric motor 12 to the force transmission mechanism 24 is provided between the worm gear 16 and the cable drums 26 of the force transmission mechanism 24. The shift clutch 18 is designed as a frictional clutch, namely as a belt clutch, wherein the drive side of the clutch 18 is fixedly coupled to the worm wheel of the worm gear 16 and the output side of the clutch 18 is fixedly coupled to the cable drums 26.

The force transmission mechanism 24 can be operationally connected to or disconnected from the drive shaft 14 of the electric motor 12 by use of the shift clutch 18. For this purpose, an electrically operated actuator unit 38, which is activatable by the electronic control unit 32, for actuating the shift clutch 18 is provided in the motor drive device 10. The worm gear 16 causes a self-inhibition in the operationally connected state.

Figure 2:
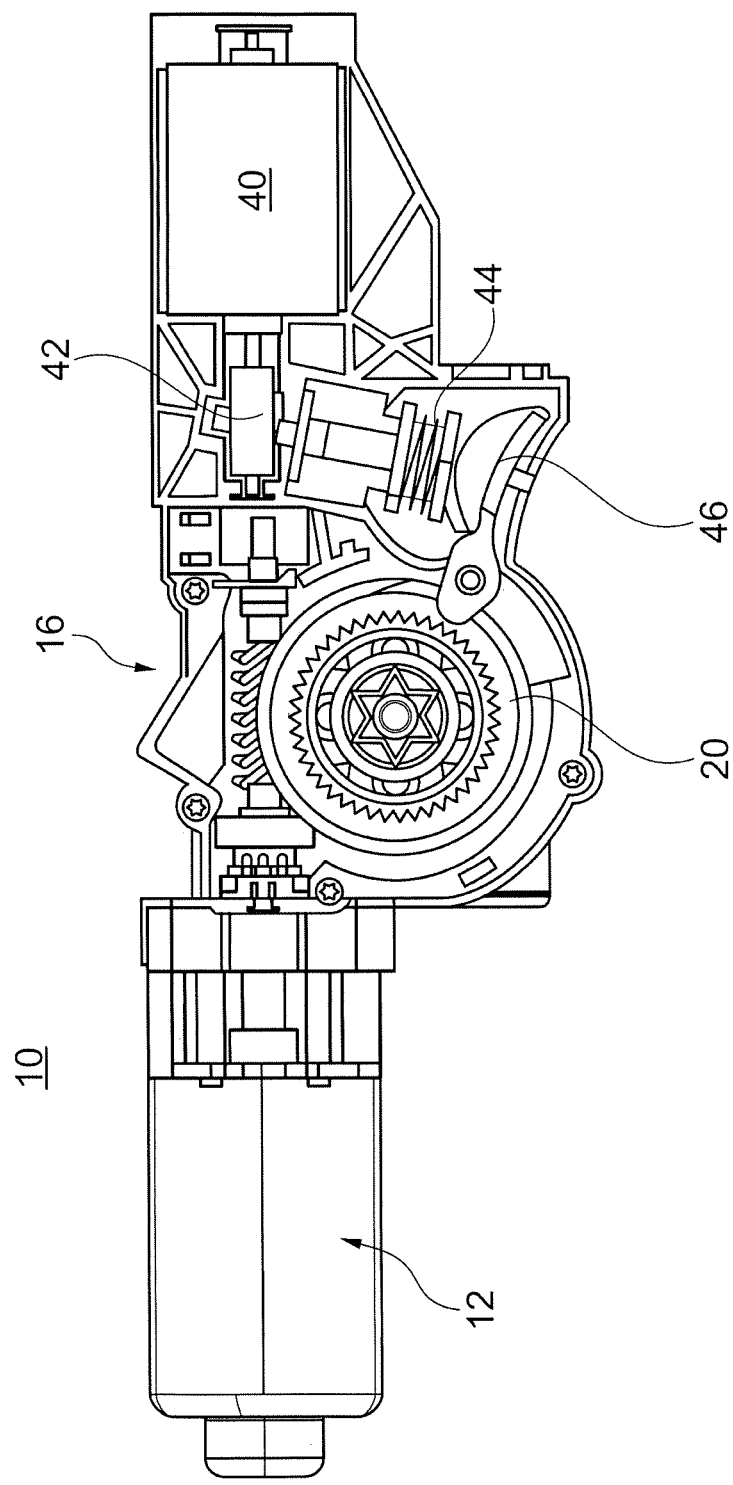
FIG. 2 is a schematic illustration rotated by 90° of the motor drive device shown in FIG.

The actuator unit 38 has an electrically operated actuator motor 40, the drive shaft of which is connected by use of a further worm gear 42 and a spindle to a cup spring assembly 44 comprising a lever 46 for tensioning or loosening the clutch belt 20 (FIG. 2). A self-inhibition is induced by this arrangement, and therefore the actuator motor 40 does not have to be continuously supplied with current.

The motor drive device 10 has sensors 28 (FIG. 1) for determining an instantaneous position of the vehicle door, which sensors are arranged on the cable drums 26 of the force transmission mechanism 24. The sensors 28 can be designed, for example, as a set of Hall sensors having a defined phase shift. Such Hall sensors are generally known from the prior art and therefore are not described herein in detail.

The electronic control unit 32 comprises a processor unit 34 and a digital data storage unit 36, to which the processor unit 34 has data-technology access. As is described herein in detail, the electronic control unit 32 is provided for predetermined functions depending on a preselection, which can be made by an operator, for example, by selecting a position of an operating element.

In the case of a first selected preselection, the electronic control unit 32 is provided for the purpose, in the event of application of a force above a predetermined force threshold value to the vehicle sliding door by the operator during a power-driven movement, of elevating a speed of the vehicle sliding door to a predetermined speed value by elevating the transmitted drive force.

In the case of a second selected preselection, the electronic control unit 32 is provided for the purpose, in the event of application of a force above the predetermined force threshold value to the vehicle sliding door by the operator during a power-driven movement, of decoupling the force transmission mechanism 24 and the electric motor 12 by use of the shift clutch 18. In one specific exemplary embodiment, the force threshold value is 80 N. In other embodiments, the force threshold value can also be selected differently.

The vehicle which may be a minivan is equipped with an ESC (electronic stability control) system, which comprises multiple acceleration sensors. Furthermore, the minivan has a temperature sensor for measuring the exterior temperature and a sensor or other device for determining a drive voltage of the electric motor 12. The output signals of these sensors are analyzed in various electronic monitoring units of the minivan. The electronic monitoring units are connected to a controller area network (CAN) bus system 48.

The electronic control unit 32 is provided for the purpose of receiving the analyzed output signals of the acceleration sensors, the temperature sensor, and the device for determining the drive voltage of the electric motor 12 by use of the CAN bus system 48 and storing the received analyzed output signals regularly in the digital data storage unit 36. The electronic control unit 32 is furthermore provided for the purpose of configuring a force to be exerted by the electric motor 12 on the vehicle sliding door depending on the received analyzed output signals. For this purpose, lookup tables (LUT) for the corresponding combinations of output signals of the sensors are stored in the digital data storage unit 36, which the processor unit 34 can access.

Figure 4:
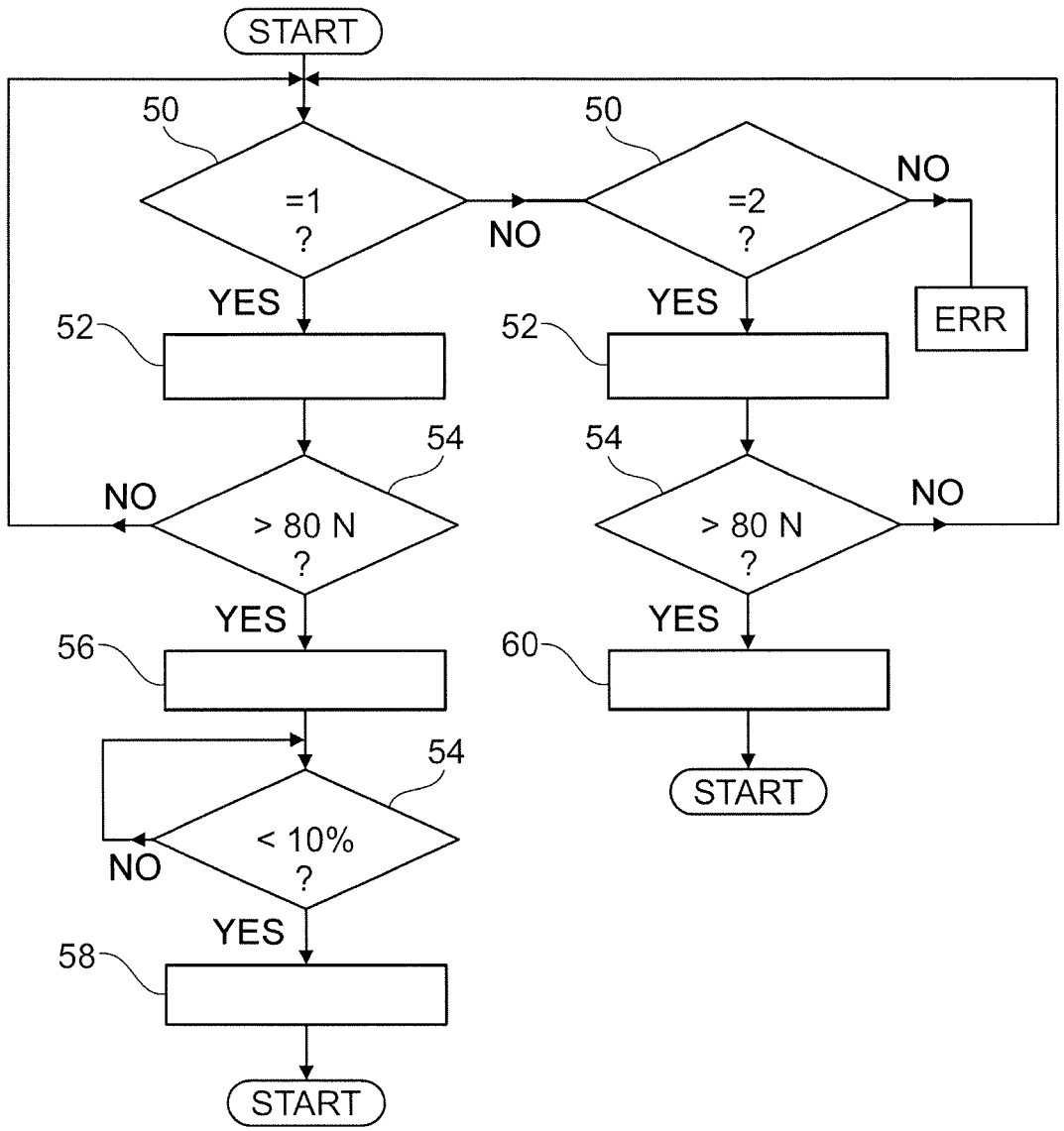
FIG. 4 is a flow chart of an embodiment of the method for operating the motor drive device according to FIG. 1.

One possible embodiment of a method for operating the motor drive device 10 according to FIGS. 1 and 2 during a movement between the open position and the closed position will be described hereafter. A flow chart of the method is shown in FIG. 4, according to one embodiment. The electronic control unit 32 includes a software module for automatically executing the method, wherein steps of the method are provided as program code to be executed, which is stored in the digital data storage unit 36 of the electronic control unit 32 and can be executed by the processor unit 34 of the electronic control unit 32.

In preparation for carrying out the method, it is assumed that all participating devices and components are in an operationally-ready state and are in the arrangement shown in FIGS. 1 and 2. In a step 50 of the method, the preselection made by the operator is ascertained. Using the lookup tables and the stored sensor output signals, in a further step 52, a force required for moving the vehicle sliding door to achieve a predetermined normal speed is ascertained. The difference of the ascertained required force and the force instantaneously output by the electric motor 12 is subsequently compared in a further step 54 to the predetermined force threshold value. A difference between the ascertained required force and the force instantaneously output by the electric motor 12 corresponds to a force exerted by the operator on the vehicle sliding door.

If the ascertained preselection made corresponds to a first option and if the force exerted by the operator on the vehicle sliding door lies above the predetermined force threshold value of 80 N, the speed of the vehicle sliding door is elevated, in a further step 56 of the method, to the predetermined, elevated speed value by elevating the transmitted drive force of the electric motor 12 and the vehicle sliding door is accordingly moved faster. Step 54 of comparing the force exerted by the operator on the vehicle sliding door to the predetermined force threshold value is carried out periodically by the electronic control unit 32. If the force exerted by the operator on the vehicle sliding door falls to a value which is less than 10% of the predetermined force threshold value, the electric motor 12 is activated in a further step 58 of the method to decelerate the vehicle sliding door to the predetermined normal speed.

If the ascertained preselection made corresponds to a second option and if the force exerted by the operator on the vehicle sliding door lies above the predetermined force threshold value of 80 N, the shift clutch 18 is activated to decouple the force transmission mechanism 24 and the electric motor 12, in a further step 60 of the method, from the electronic control unit 32. The vehicle sliding door can be moved by the operator at a desired speed while maintaining an exerted force of at least 80 N in a manual operating mode.

Figure 3:
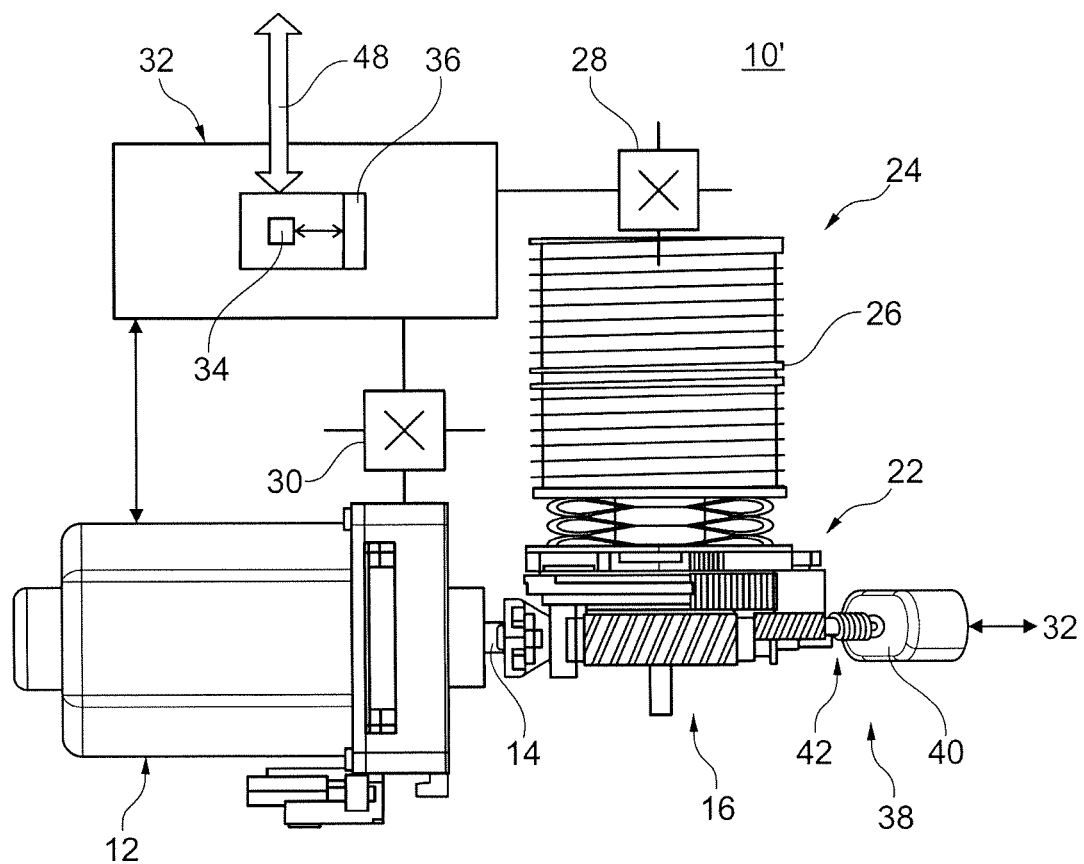
FIG. 3 is a schematic illustration of an alternative motor drive device according to one embodiment for moving a movable vehicle sliding door.

An alternative motor drive device 10' according to one embodiment for moving the movable vehicle sliding door is schematically shown in FIG. 3. In contrast to the embodiment of the motor drive device 10 according to FIGS. 1 and 2, the shift clutch 22 is designed as an interlocking clutch, which does not permit actuation under load. The alternative motor drive device 10' therefore contains additional sensors 30 for determining an instantaneous rotational position of the electric motor 12. The sensors 30 can be designed, like the sensors 28 on the output side, as a set of Hall sensors having a defined phase shift.

In the alternative motor drive device 10' according to one embodiment, the electronic control unit 32 is provided for the purpose of only activating the electrically operated actuator unit 38 for actuating the shift clutch 22 when a speed difference, which is computed from the sensors 30 for determining an instantaneous rotational position of the electric motor 12 and the sensors 28 for determining an instantaneous position of the vehicle sliding door, lies below a predetermined threshold value. After this synchronization of the drive side and the output side, the actuation of the clutch 22 is enabled. In the case of operation of the alternative motor drive device 10' according to this embodiment using the above-disclosed method, an actuation of the shift clutch 22 is preceded by this step in each case. With this additional step, the disclosed method is also executable in the described manner using the alternative motor drive device 10'.

It is to be noted that the features and measures listed individually in the following description can be combined with one another in an arbitrary, technically reasonable manner and disclose further embodiments of the disclosure. The description additionally characterizes and specifies the invention in particular in conjunction with the figures.

A motor drive device is provided according to one embodiment for moving a movable vehicle sliding door. The device comprises an activatable electric motor, a force transmission mechanism, which is operationally connectable to the vehicle sliding door and the electric motor, to transmit a drive force provided by the electric motor to the vehicle sliding door, sensors at least for determining an instantaneous position of the vehicle sliding door, and an electronic control unit for activating at least the electric motor.

Furthermore, a shift clutch, which is coupled to the force transmission mechanism and can be coupled to the electric motor, is provided for the smooth, load-independent coupling of the electric motor to the force transmission mechanism. The electronic control unit is provided for the purpose, depending on a preselection by an operator, in the event of application of a force above a predetermined force threshold value to the vehicle sliding door by the operator during a power-driven movement, either of elevating a speed of the vehicle sliding door to a predetermined speed value by elevating the transmitted drive force or of decoupling the force transmission mechanism and the electric motor by use of the shift clutch.

A "vehicle" is to be understood in the meaning of this disclosure to include a passenger automobile, a minivan, a truck, or a bus, according to exemplary embodiments.

An "electronic control unit" is to be understood in the meaning of this disclosure to include an electronic computer unit comprising at least one electronic regulating circuit and/or at least one electronic control circuit.

The term "operationally connected" is to be understood in the meaning of the disclosure to mean that operationally-connected objects are connected to one another such that a transmission of a force and/or a torque and/or a torsion moment is possible between the objects. The transmission can take place in this case both by direct contact and also indirectly, by way of an intermediate element.

The term "provided for the purpose" is to be understood in the meaning of this disclosure as programmed, designed, configured or arranged for the purpose.

In the event of a suitable preselection by the operator, the operator can open or close the vehicle sliding door by use of the motor drive device at a speed having the predetermined speed value, which is elevated in relation to a speed in a normal operation.

An execution of the movement at elevated speed can also be controlled by application of the level of the force exerted by the operator, by more than one force threshold value being provided and the predetermined speed value being dependent on reaching one of the force threshold values.

In the event of another preselection by the operator, by way of the shift clutch, the operator can manually open or close the vehicle sliding door at a higher speed in relation to the normal operation. In this manner, a change from a power-driven operation to a manual operation during the power-driven operation is enabled. The preselection by the operator can take place, for example, by setting a switch position on the electronic control unit.

The motor drive device can be provided for moving the movable vehicle sliding door at least between an open position and a closed position of the vehicle sliding door. The speed of the vehicle sliding door can be computed, for example, from signals of the sensors for determining an instantaneous position of the vehicle sliding door by calculating a differential quotient.

The sensors at least for determining an instantaneous position of the vehicle sliding door are preferably arranged on the force transmission mechanism. The determination of the instantaneous position of the vehicle sliding doors can thus be executable independently of a state of the electric motor. Therefore, if the force exerted by the operator on the vehicle sliding door falls away, a rapid and nonetheless smooth transition to a power-driven operating mode can be enabled.

In one embodiment of the motor drive device, the shift clutch is designed as a frictional clutch and an electrically operated actuator unit, which is activatable by the electronic control unit, is provided for actuating the clutch. In this embodiment, the sensors arranged on the force transmission mechanism, i.e., on the output side of the electric motor, are advantageously sufficient for determining the instantaneous position of the vehicle sliding door.

In a further embodiment of the motor drive device, the shift clutch is designed as an interlocking clutch. Furthermore, additional sensors at least for determining an instantaneous rotational position of the electric motor and an electrically operated actuator unit, which is activatable by the electronic control unit, for actuating the clutch are provided. In this case, the electronic control unit is provided for the purpose of only activating the actuator unit if a speed difference, which is computed from the sensors for determining an instantaneous rotational position of the electric motor and the sensors for determining an instantaneous position of the vehicle sliding door, is below a predetermined threshold value.

In this manner, a synchronization of the speed on the drive side of the electric motor and the speed on the output side of the electric motor can be executed, whereby the use of an interlocking clutch, which does not enable actuation under load, can be enabled with the known advantages of a compact construction of clutch and actuator unit.

In one embodiment of the motor drive device, the electronic control unit is provided for the purpose of receiving output signals of at least one sensor, in order to configure a force to be exerted by the electric motor on the vehicle sliding door depending on the received output signals. The at least one sensor may be designed as an acceleration sensor or location sensor or may be provided for determining a drive voltage of the electric motor or for determining a temperature. By using a sensor which is designed as an acceleration sensor or location sensor, a force acting due to earth's gravity on the vehicle sliding door can be taken into consideration, for example, for a determination of the drive force to be provided by the electric motor. The output signals of the at least one sensor, which is designed as an acceleration or location sensor, can be provided, for example, by an ABS (antilock braking system)/ESC (electronic stability control) system of a vehicle, on which the vehicle sliding door is installed.

By using a sensor which is provided for determining a drive voltage of the electric motor, variations of the drive voltage of the electric motor can be taken into consideration for a determination of the drive force to be provided by the electric motor and a uniform movement of the vehicle sliding door by the motor drive can be enabled in spite of existing variations. The drive force to be provided by the electric motor for the movement of the vehicle sliding door can be strongly elevated at very low exterior temperatures because of the viscosity of lubricants, which is thus generally elevated, and an elevated stiffness of elastomers used for sealing the vehicle sliding door. Furthermore, the electrical properties of the electric motor, for example, the impedance of the windings, are also temperature-dependent.

By using a sensor which is designed as a temperature sensor, temperature influences can be taken into consideration for a determination of the drive force to be provided by the electric motor and in spite of existing variations, a uniform movement of the vehicle sliding door by the motor drive can be enabled. In this case, the temperature to be determined can be an exterior temperature and/or a vehicle interior temperature.

The output signals of the at least one sensor can be provided as already analyzed signals. However, the electronic control unit can also be provided for the purpose of analyzing raw signals of acceleration sensors or location sensors, sensors for determining a drive voltage of the electric motor, and/or temperature sensors themselves.

In one embodiment of the motor drive device, at least one sensor for determining a drive voltage of the electric motor and/or at least one temperature sensor are/is provided in the motor drive device, whereby the determination of the drive force to be provided by the electric motor can be executable particularly simply.

In one advantageous embodiment of the motor drive device, the electronic control unit comprises at least one processor unit and a digital data storage unit, to which the processor unit has data-technology access. In this manner, an automatic and reliable execution of procedures for which the electronic control unit is provided can be enabled. In particular, the processor unit and/or the digital data storage unit can be part of a microcontroller. Such microcontrollers are presently commercially available in many variations at cost-effective prices. The predetermined threshold values disclosed in this application can advantageously be stored in the digital data storage unit, whereby a fast data access can be achieved.

The electronic control unit can be provided for the purpose of regularly storing received output signals from sensors and/or received measured values determined from the output signals in the digital data storage unit. In this manner, the signals received from the sensors and/or the ascertained measured values can be available for determining a drive force to be provided by the electric motor even when the vehicle has been shut down in the meantime or the ignition of the vehicle has been turned off.

In a further aspect of the disclosure, a method is proposed for operating a motor drive device according to one embodiment during a movement of a movable vehicle sliding door between an open position and a closed position. The method includes at least the following steps of ascertaining the preselection made by the operator, ascertaining a force required for moving the vehicle sliding door to achieve a predetermined normal speed while using stored sensor output signals, comparing a difference of the ascertained required force and the force instantaneously output by the electric motor to the predetermined force threshold value, and in the case of an ascertained first option of the preselection made by the operator and a difference between the ascertained required force and the force instantaneously output by the electric motor, which lies above the predetermined force threshold value, elevating the speed of the vehicle sliding door to the predetermined, elevated speed value by elevating the transmitted drive force. The method also includes the steps of in the case of the ascertained first option of the preselection and in the case of a difference between the ascertained force required for the elevated speed and the force instantaneously output by the electric motor close to zero, activating the electric motor to decelerate the vehicle sliding door to the predetermined normal speed, and in the case of an ascertained second option of the preselection made by the operator and in the case of a difference between the ascertained required force and the force instantaneously output by the electric motor, which lies above the predetermined force threshold value, activating the shift clutch to decouple the force transmission mechanism and the electric motor.

A "force difference close to zero" is to be understood in the meaning of this disclosure as a difference of less than 20%, preferably less than 10%, and particularly preferably less than 5% of the predetermined force threshold value.

By way of the method according to one embodiment, it is made possible for the operator to open or close the vehicle sliding door during the power-driven movement of the vehicle sliding door between the open position and the closed position by use of the motor drive device at a higher speed than during the normal operation. Furthermore, the operator can open or close the vehicle sliding door manually at a higher speed in relation to the normal operation. In this manner, a change from a power-driven operation to a manual operation during the power-driven operation is enabled.

The force instantaneously output by the electric motor can be determined, for example, from the electric current, which is supplied to the electric motor as a result of the activation by the electronic control unit.

The execution of the steps of ascertainment and comparison preferably takes place in regular repetitions, wherein the time interval of the repetitions is adapted to the speed of the movement of the vehicle sliding door.

Independently of the ascertained preselection, upon reaching predetermined positions of the vehicle sliding door, an activation of the braking unit for decelerating the vehicle sliding door down to a standstill in the open position or closed position can be provided.

In one embodiment of the method, the step of ascertaining a force required for moving the vehicle sliding door includes an incorporation of sensor output signals with respect to at least one of the measured variables temperature, inclined position of the vehicle, and drive voltage of the electric motor. In this manner, the force to be ascertained to reach the predetermined normal speed of the vehicle sliding door can be adapted to changes of external conditions.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor drive device for moving a movable vehicle sliding door, comprising:
an activatable electric motor;
a force transmission mechanism operationally connectable to the vehicle sliding door and the electric motor to transmit a drive force provided by the electric motor to the vehicle sliding door;
one or more sensors determining an instantaneous position of the vehicle sliding door;
an electronic control unit for activating at least the electric motor; and
a shift clutch coupled to the force transmission mechanism and couplable to the electric motor provided for load-independent coupling of the electric motor to the force transmission mechanism, wherein depending on a preselection by an operator, in the event of application of a force above a predetermined force threshold value to the vehicle sliding door by the operator during a power-driven movement, either elevates a speed of the vehicle sliding door to a predetermined speed value by elevating the transmitted drive force or decouples the force transmission mechanism and the electric motor by use of the shift clutch.

2. The motor drive device as claimed in claim 1, wherein the one or more sensors for determining an instantaneous position of the vehicle sliding door are arranged on the force transmission mechanism.

3. The motor drive device as claimed in claim 1, wherein the shift clutch is designed as a frictional clutch and an electrically operated actuator unit, which is activatable by the electronic control unit, is provided for actuating the clutch.

4. The motor drive device as claimed in claim 1, wherein the shift clutch is designed as an interlocking clutch, and the one or more sensors for determining an instantaneous rotational position of the electric motor and an electrically operated actuator unit, which is activatable by the electronic control unit, for actuating the clutch are provided, wherein the electronic control unit is provided for the purpose of only activating the actuator unit if a speed difference, which is computed from the one or more sensors for determining an instantaneous rotational position of the electric motor and the one or more sensors for determining an instantaneous position of the vehicle sliding door, is below a predetermined threshold value.

5. The motor drive device as claimed in claim 1, wherein the electronic control unit is provided for the purpose of receiving output signals of at least one sensor, in order to configure a force to be exerted by the electric motor on the vehicle sliding door depending on the received output signals, wherein the at least one sensor is designed as an acceleration sensor or location sensor or is provided for determining a drive voltage of the electric motor or for determining a temperature.

6. The motor drive device as claimed in claim 1, wherein the electronic control unit comprises at least one processor unit and a digital data storage unit, to which the processor unit has data-technology access.

7. The motor drive device as claimed in claim 6, wherein the electronic control unit is provided for regularly storing received output signals from sensors in the digital data storage unit.

8. A device for moving a vehicle sliding door, comprising:
a motor;
a force transmission mechanism to transmit a drive force of the motor to the door;
sensors determining position of the door; and
a shift clutch for coupling the motor to the force transmission mechanism, wherein application of sufficient force to the door by an operator during motor driven movement either elevates a speed of the door or decouples the force transmission mechanism.

9. The device as claimed in claim 8, wherein depending on a preselection by an operator, in the event of application of a force above a predetermined force threshold value to the vehicle sliding door by the operator during a power-driven movement, either elevates a speed of the sliding door to a predetermined speed value by elevating the transmitted drive force or decouples the force transmission mechanism and the motor by use of the shift clutch.

10. The device as claimed in claim 8, wherein the sensors for determining the position of the sliding door are arranged on the force transmission mechanism.

11. The device as claimed in claim 8 further comprising a control unit for activating the motor.

12. The device as claimed in claim 11, wherein the shift clutch is designed as a frictional clutch and an electrically operated actuator unit, which is activatable by the control unit, is provided for actuating the clutch.

13. The device as claimed in claim 11, wherein the shift clutch is designed as an interlocking clutch, and the sensors for determining the position of the motor and an electrically operated actuator unit, which is activatable by the control unit, for actuating the clutch are provided, wherein the control unit is provided for the purpose of only activating the actuator unit if a speed difference, which is computed from the sensors for determining an instantaneous rotational position of the motor and the sensors for determining a position of the sliding door, is below a predetermined threshold value.

14. The device as claimed in claim 11, wherein the control unit is provided for the purpose of receiving output signals of at least one sensor, in order to configure a force to be exerted by the motor on the sliding door depending on the received output signals, wherein the at least one sensor is designed as an acceleration sensor or location sensor or is provided for determining a drive voltage of the motor or for determining a temperature.

15. The device as claimed in claim 11, wherein the control unit comprises at least one processor unit and a digital data storage unit, to which the processor unit has data-technology access.

16. The device as claimed in claim 15, wherein the control unit is provided for regularly storing received output signals from sensors in the digital data storage unit.

17. A method for operating a motor drive device, during a movement of a movable vehicle sliding door between an open position and a closed position, comprising:
ascertaining a preselection made by an operator;
ascertaining a force required for moving the vehicle sliding door to achieve a predetermined normal speed while using stored sensor output signals;
comparing a difference of the ascertained required force and the force instantaneously output by the electric motor to the predetermined force threshold value;
in the case of an ascertained first option of the preselection made by the operator and a difference between the ascertained required force and the force instantaneously output by the electric motor, which lies above the predetermined force threshold value, elevating the speed of the vehicle sliding door to the predetermined, elevated speed value by elevating the transmitted drive force;
in the case of the ascertained first option of the preselection and in the case of a difference between the ascertained force required for the elevated speed and the force instantaneously output by the electric motor close to zero, activating the electric motor to decelerate the vehicle sliding door to the predetermined normal speed; and
in the case of an ascertained second option of the preselection made by the operator and in the case of a difference between the ascertained required force and the force instantaneously output by the electric motor, which lies above the predetermined force threshold value, activating the shift clutch to decouple the force transmission mechanism and the electric motor.

18. The method as claimed in claim 17, wherein the step of ascertaining a force required for moving the vehicle sliding door includes an incorporation of sensor output signals with respect to at least one of the measured variables temperature, inclined position of the vehicle, and drive voltage of the electric motor.

* * * * *